US010397530B2

(12) United States Patent
Chen et al.

(10) Patent No.: US 10,397,530 B2
(45) Date of Patent: Aug. 27, 2019

(54) METHOD OF DETERMINING A TOUCH POSITION AND TOUCH PROJECTION SYSTEM USING THE METHOD

(71) Applicant: Coretronic Corporation, Hsin-Chu (TW)

(72) Inventors: Yung-Chih Chen, Hsin-Chu (TW); Je-Fu Cheng, Hsin-Chu (TW); Yai-Chien Hong, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 5 days.

(21) Appl. No.: 15/487,296

(22) Filed: Apr. 13, 2017

(65) Prior Publication Data

US 2017/0300176 A1 Oct. 19, 2017

(30) Foreign Application Priority Data

Apr. 14, 2016 (CN) .......................... 2016 1 0229919

(51) Int. Cl.
*H04N 9/31* (2006.01)
*G06F 3/042* (2006.01)
*G06F 3/041* (2006.01)

(52) U.S. Cl.
CPC ......... *H04N 9/3147* (2013.01); *G06F 3/0418* (2013.01); *G06F 3/0421* (2013.01);
(Continued)

(58) Field of Classification Search
CPC ...... G06F 3/0425; G06F 3/0426; G06F 3/042; G06F 3/0416; G06F 3/0412; G06F 3/041;
(Continued)

(56) References Cited

U.S. PATENT DOCUMENTS

| 9,578,295 | B1* | 2/2017 | Morrison | H04N 9/3185 |
|---|---|---|---|---|
| 2011/0050640 | A1 | 3/2011 | Lundback | |
| 2014/0267193 | A1* | 9/2014 | Barton | G06F 3/0386 345/182 |
| 2015/0029465 | A1* | 1/2015 | Ishikawa | G06T 3/005 353/30 |
| 2017/0205952 | A1* | 7/2017 | Chen | G06F 3/0418 |

FOREIGN PATENT DOCUMENTS

| CN | 101930724 A | 12/2010 |
|---|---|---|
| CN | 202058126 U * | 11/2011 |

(Continued)

OTHER PUBLICATIONS

Kong et al, "Development of the Fishbowl Game Employing a Tabletop Tiled Display Coupling With Mobile Interfaces", Journal of Korea Game Society, 10, 2, 57-66 (2010). (Year: 2010).*
(Continued)

*Primary Examiner* — Julie Anne Watko (57) ABSTRACT

A method of determining a touch position and a touch projection system using the above-mentioned method are provided. The touch projection system has multiple interactive projection apparatuses. The method includes steps of: projecting each of the projection sub-images to a projection touch area, and forming a blending projection image having an overlap area; capturing the blending projection image within a viewing angle range of an image capture unit; providing a portion of information of a positioning pattern to each of the projection units, projecting each of the projection sub-images to the projection touch area, and capturing each of the projection sub-images having a portion of the positioning pattern, and forming a positioning image respectively; confirming a coordinate range of the overlap area located within the blending projection image according to each of the positioning images.

11 Claims, 8 Drawing Sheets

(52) U.S. Cl.
CPC ......... *G06F 3/0425* (2013.01); *H04N 9/3194* (2013.01); *G06F 3/0412* (2013.01); *G06F 3/0428* (2013.01); *G09G 2300/026* (2013.01); *G09G 2356/00* (2013.01)

(58) Field of Classification Search
CPC ... G06F 3/03; G06F 3/011; G06F 3/01; G06F 3/00; G06F 3/0418; G06F 3/0421; G06F 3/1446; G06F 3/1423; G06F 3/0428; H04N 9/3147; H04N 9/3141; H04N 9/31; H04N 9/312; H04N 9/04; H04N 9/00; H04N 9/3194; G09G 2300/026; G09G 2300/02; G09G 2300/00; G09G 3/00; G09G 3/001; G09G 3/002; G09G 3/007; G09G 2360/14; G09G 2360/141; G09G 2360/145; G09G 2360/122; G09G 2360/12; G09G 2360/10; G09G 2360/00; G09G 2356/00
See application file for complete search history.

(56) References Cited

FOREIGN PATENT DOCUMENTS

| CN | 105376540 | A | * | 3/2016 | |
| CN | 105376540 | A | | 3/2016 | |
| JP | 2003315914 | A | * | 11/2003 | |
| JP | 2011258244 | A | * | 12/2011 | ........... G06F 3/0428 |
| JP | 2015158658 | A | * | 9/2015 | ........... G06F 3/1446 |

OTHER PUBLICATIONS

English Translation of Kong et al, "Development of the Fishbowl Game Employing a Tabletop Tiled Display Coupling With Mobile Interfaces", Journal of Korea Game Society, 10, 2, 57-66 (2010). (Year: 2010).*

Teubl et al, "FastFusion: A Scalable Multi-Projector System", Proceeding of the 11th World Congress on Intelligent Control and Automation (WCICA), 2014, p. 2475-80. (Year: 2014).*

* cited by examiner

METHOD OF DETERMINING A TOUCH POSITION AND TOUCH PROJECTION SYSTEM USING THE METHOD

CROSS-REFERENCE TO RELATED APPLICATION

This application claims the priority benefit of China application serial no. 201610229919.7, filed on Apr. 14, 2016. The entirety of the above-mentioned patent application is hereby incorporated by reference herein and made a part of this specification.

FIELD OF THE INVENTION

The invention relates to an interactive projection system and a method of processing a touch position thereof, and more particularly to an interactive projection system generating a blending projection image by utilizing more than two interactive projection apparatuses, and a method of determining a touch coordinate thereof.

BACKGROUND OF THE INVENTION

An interactive projection apparatus mainly utilizes an invisible light emitter (such as an infrared laser emitter) to generate an invisible light curtain. When an object (e.g. a stylus pen, a finger or a hand) is located within the invisible light curtain, an invisible light is reflected from the object. At this moment, the image including the reflected invisible light is photographed by a camera so as to find out the coordinate of the object. Then, the coordinate of the object is transmitted to the apparatus (PC) such that the position of the object may be acknowledged.

In some applications, more than two projectors must be utilized for forming a larger blending projection image on a projection screen. In order to obtain a seamless blending image, the projecting areas of the two projectors must be overlapped. However, if a touch point occurs within an overlap area of the projecting areas, the touch point is photographed by cameras equipped with both left and right projectors, for example. The coordinates of the same point is reported by two projection touch apparatuses. Problems of inconsistence are caused due to the different installation angles and the different ranges of two cameras of the projection touch apparatuses.

Figure 1:
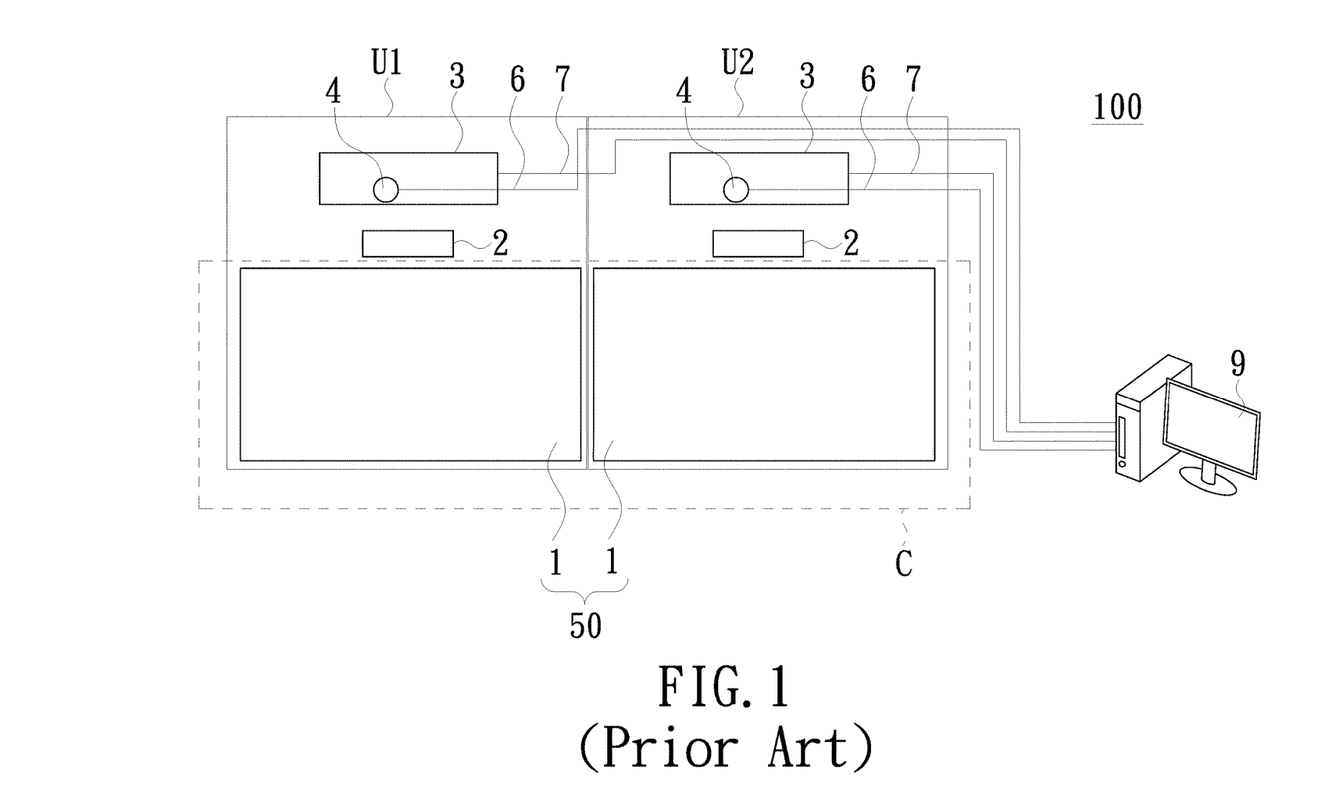
FIG. 1 is a schematic view of a conventional touch projection system.

Please refer to FIG. 1, an interactive projection system 100 includes two interactive projection apparatuses U1, U2, and a computer 9 serving as an image source and a system operation control device. Each of the interactive projection apparatuses U1, U2 includes a projection unit 3, an image capture unit 4, and an invisible light emitter 2. The two projection units 3 respectively projects projection sub-images 1 onto a projection area C to form a blending image 50.

The two projection units 3 respectively projects projection sub-images 1 with an overlap area. If a touch point occurs within the overlap area, multiple time point-reporting problems occur in the interactive projection system 100 since the touch point is photographed by the image capture units 4 of both left and right interactive projection apparatuses U1, U2. In other words, different touch point positions may be obtained from different image capture units 4, which capture the touch points in near but different positions, and thus it cannot be determined which one of the different touch point positions is correct. In addition, while the projection image is blended by an operation of the user, since the installation position of the two interactive projection apparatuses U1, U2 may be different, the overlap area of the projection sub-image 1 may not be the same for each individual installation, thus it is unable to predict the position of the overlap area, and therefore the proceeding process cannot be finished.

The information disclosed in this "BACKGROUND OF THE INVENTION" section is only for enhancement understanding of the background of the invention, and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

An object of the invention is to solve the problem that the overlap area range of blending screen of touch projection system cannot be confirmed in advance, as well as the problems of repeated reporting points generated within the overlap area and other issues.

The invention provides a method of determining a touch position, and the method is used for a touch projection system, the touch projection system includes at least two interactive projection apparatuses and a computer apparatus connected to the interactive projection apparatuses. Each of the interactive projection apparatuses comprises a projection unit and an image capture unit, the projection unit projects a projection sub-image, the image capture unit has a viewing angle range, and the viewing angle range covers the corresponding projection sub-image to capture the projection sub-image within the viewing angle range. The method provided by the invention includes the following steps: projecting each projection sub-image to a projection touch area, so that each projection sub-image is partially overlapped with the adjacent one of the other projection sub-image to form a blending projection image has an overlap area; capturing the blending projection image within the viewing angle ranges of the image capture units; providing a portion of information of a dynamic or static positioning pattern to each projection unit, projecting each projection sub-image with a portion of information of the positioning pattern to the projection touch area, and capturing each projection sub-image with a portion of information of the positioning pattern, so as to form a positioning image respectively; and confirming a coordinate range of the overlap area located within the blending projection image according to each of the positioning images.

The invention also provides a touch projection system using the above-mentioned method of determining a touch position. The touch projection system includes at least two interactive projection apparatuses and a computer apparatus connecting to the interactive projection apparatuses. Each of the interactive projection apparatuses includes respectively a projection unit for projecting a projection sub-image; and an image capture unit with a viewing angle range, wherein the viewing angle range covers the projection sub-image to capture the projection sub-image within the viewing angle range. Each of the projection units projects a corresponding one of the projection sub-images to the projection touch area, so that each of the projection sub-images is partially overlapped with the adjacent at least one of the projection sub-images to form a blending projection image obtained by capturing of the image capture units, and forming at least one overlap area within the viewing angle ranges, wherein the computer apparatus provides a portion of information of a positioning pattern to each of the projection units; and each of the projection units projects a corresponding one of the projection sub-images with a portion of information of the positioning pattern to the projection touch area respectively; each of the image capture units captures a corresponding one of the projection sub-images with a portion of information of the positioning pattern and forms a positioning image respectively; and the computer apparatus confirms a coordinate range of the overlap area located within the blending projection image according to each of the positioning images.

The invention utilizes a positioning image generated by providing a positioning pattern to each of the projection units within a touch projection system to confirm a coordinate range of the overlap area located within each of the unit projection screens, and further determines a repeated reporting coordinate point of the touch point within the overlap area according to the coordinate range, and thus solves the problem that the overlap area within multiple projection units of touch projection system cannot be confirmed in advance, as well as the problems of repeated reporting points generated within the overlap area and other issues.

To make the above-mentioned and other objects, features and advantages of the invention can be more clearly comprehensible, hereinafter preferred embodiments accompanied with figures are described in detail below.

DETAILED DESCRIPTION OF PREFERRED EMBODIMENTS

Figure 2A:
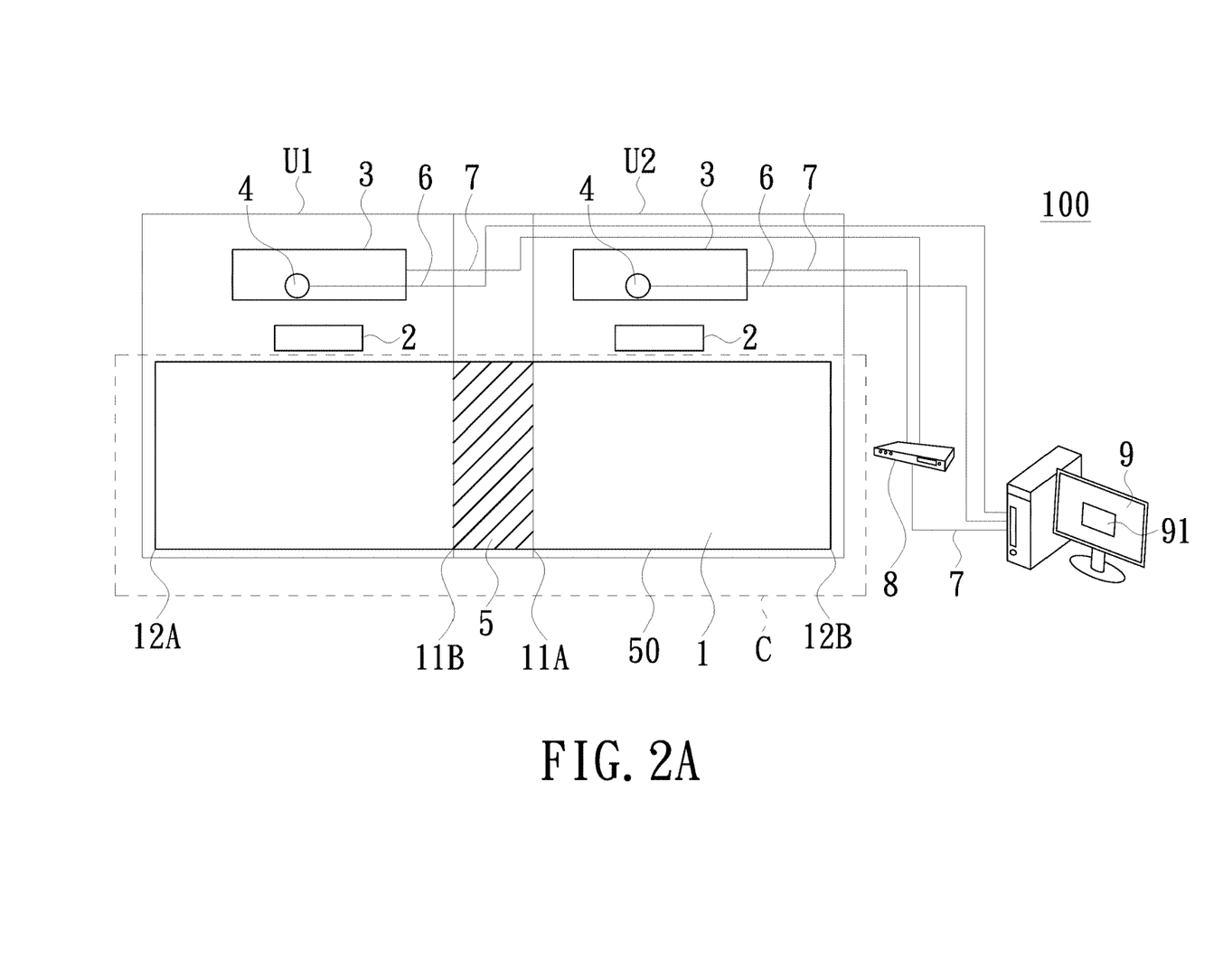
FIG. 2A is a schematic view of a state of use of a touch projection system according to an embodiment of the invention.
Figure 2B:
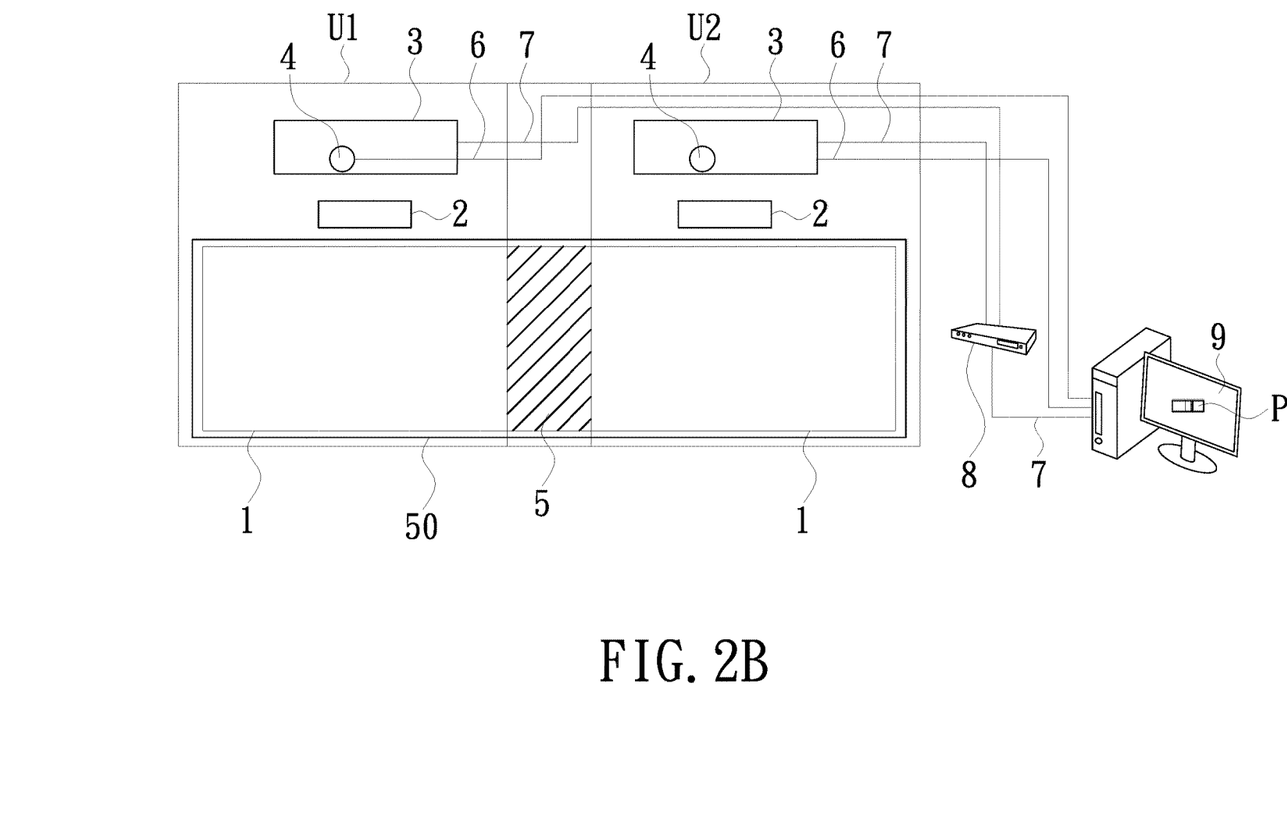
FIG. 2B is a schematic view of another state of use of the touch projection system illustrated in FIG. 2A.
Figure 3A:
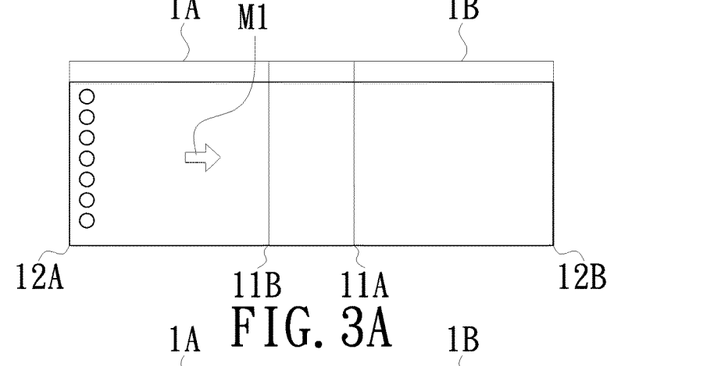
FIGS. 3A-3D are schematic views illustrating an operation of outputting a dynamic positioning pattern of a method of determining a touch position according to an embodiment of the invention.
Figure 3B:
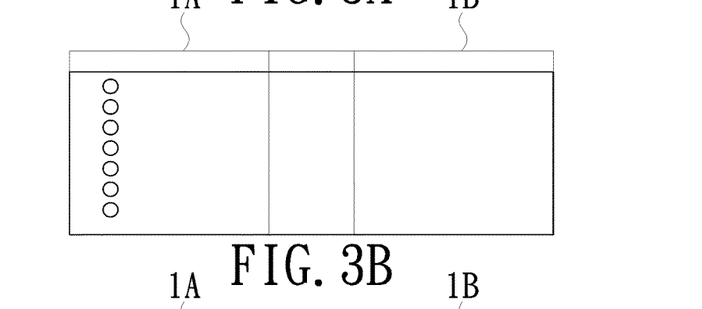
Figure 3C:
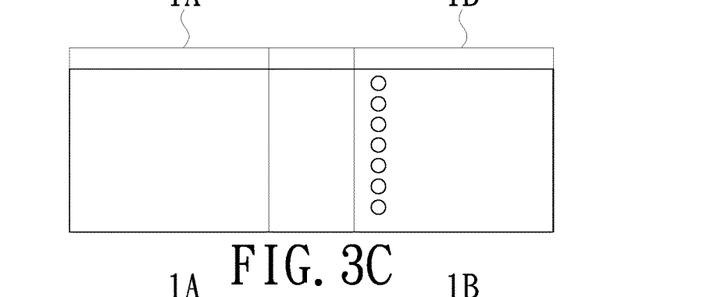
Figure 3D:
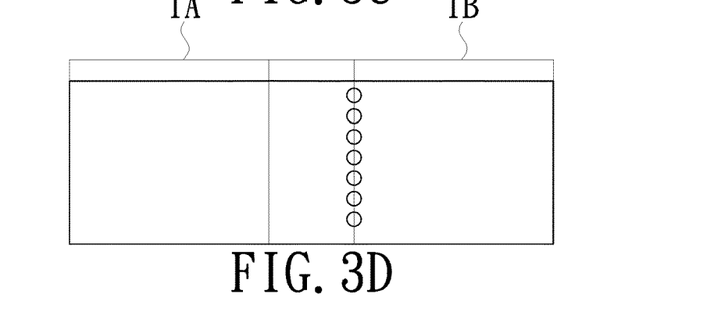
Figure 4A:
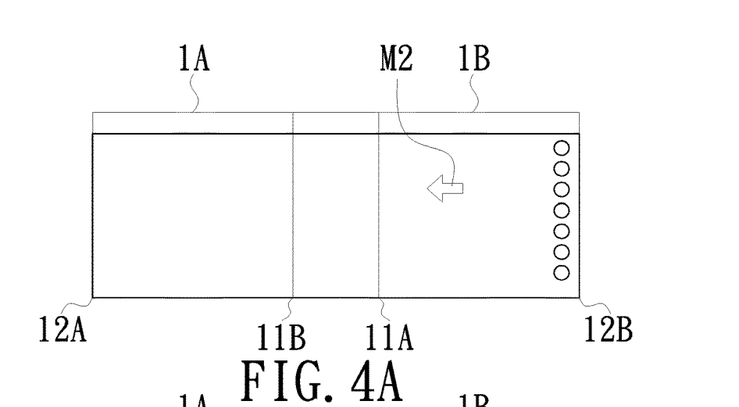
FIGS. 4A-4D are schematic views illustrating another operation of outputting another dynamic positioning pattern of a method of determining a touch position according to an embodiment of the invention.
Figure 4B:
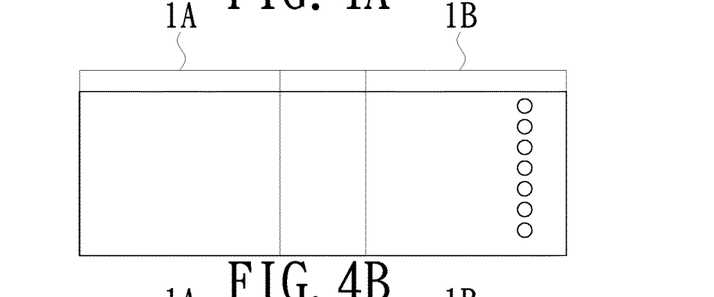
Figure 4C:
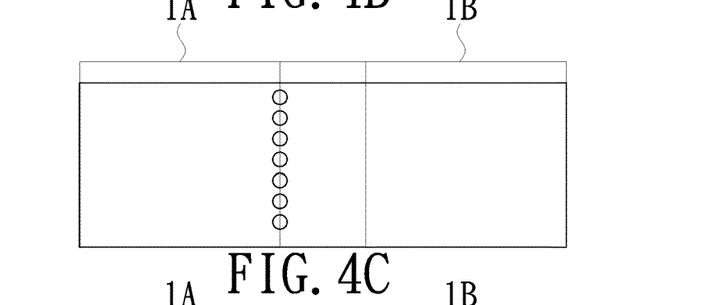
Figure 4D:
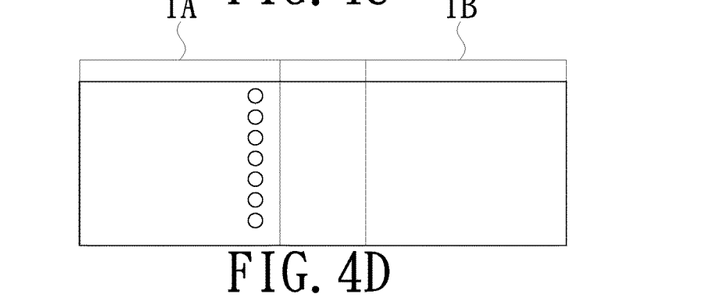

Please referring to FIG. 2A, a touch projection system 100 includes interactive projection apparatuses U1, U2, a blending box 8, a projection touch area C and a computer apparatus 9 serving as an image source and a system operation control center. The interactive projection apparatus U1 or U2 includes a projection unit 3, an image capture unit 4 and an invisible light emitter 2. The blending box 8 is, e.g., a GB-102N Dual Channel Warping & Blending Scalar of Coretronic System Engineering Corporation, but not limited. The projection unit 3 may be a projector or an apparatus of other similar functions. The touch projection system 100 may generate a projection touch area C. Each of the projection units 3 projects a projection sub-image 1 onto the projection touch area C. The projection touch area C is formed on a projection screen or a wall, etc. An object (finger) enters the range of the projection touch area C to drive the computer apparatus 9 transmitting the signal of the image frame 91 to blending box 8. The invisible light emitter 2 may be an infrared laser emitter or other light sources. The invisible light emitter 2 may be mounted on the periphery of the projection touch area C. The invisible light emitter 2 emits an invisible light to form a light curtain covering the projection touch area C, so as to produce a variation of optical state in the projection touch area C in response to a touch operation. For example, a finger touches the light curtain and produces a reflection of the invisible light. The image capture unit 4 of the interactive projection apparatus U1 or U2 senses a touch point. It is to be described in advance that, a covering range of the light curtain emitted from the invisible light emitter 2 indicated in FIG. 2A is equivalent to the covering range of projection touch area C. However, in many cases, the covering range actually covered by the light curtain is larger than the covering range of the projection touch area C. The number and positions of the installed invisible light emitters 2 may also be adjusted according to the actual needs from manufacturer. The image capture unit 4 may be a camera or other apparatus having photosensitive function or imaging capture function. Each image capture unit 4 has a viewing angle range (not shown) covering the corresponding projection sub-image 1, so as to capture the projection sub-image 1 within the viewing angle range of the image capture unit 4.

It is to be described in advanced that, the viewing angle range of each image capture unit 4 indicated in FIG. 2A is equivalent to the range of the corresponding projection sub-image 1, but not limited. However, errors may still exist due to factors of installing angles of the interactive projection apparatuses, installing positions, and characteristics of the apparatuses themselves. The blending box 8 is connected between the computer apparatus 9 and the interactive projection apparatuses U1, U2. The blending box 8 receives a signal of an image frame 91 from the computer apparatus 9. The blending box 8 processes the signal of the image frame 91. For example, the blending box 8 may divide the image frame 91 into several parts corresponding to the amount of the projection unit 3. The blending box 8 generates processed signals associated with the several parts corresponding to the signal of the image frame 91. Then, the blending box 8 provides processed signals associated with the signal of the image frame 91 to each of projection unit 3 respectively, and then each projection sub-image 1 is projected onto the projection touch area C to form a blending projection image 50. However, the projection units 3 may project the sub-images 1 with the same content as well as the content of the image frame 91.

Each image capture unit 4 may be equipped with the corresponding projection unit 3 respectively. Each projection unit 3 may be linked to the blending box 8 through an image transmission line 7, such as an HDMI cable or USB cable, to transmit the signal of image frame. The blending box 8 is linked to the computer apparatus 9 via the image transmission line 7. Each image capture unit 4 is linked to the computer apparatus 9 through data transmission line 6, such as an USB cable, to transmit a signal of the captured image. In the embodiments, the blending box 8 may be omitted, such that each projection unit 3 is linked directly to the computer apparatus 9 via the image transmission line 7.

In order to achieve a blending image frame and a calibration of the touch screen after image blending, the method of the invention including image blending method and calibration method is described as follows: overlapping the image frames projected by multiple projector units 3, and then making the image frames to be seamless through the blending box 8, followed by establishing a virtual overlap area range through an overlap area detection (OAD) technology, so that the touch area may also be seamless and thus avoid repeated reports of the touch points. When there is a touch point entering the virtual overlap area, it is treated with the blending touch analysis (BTA) technology and then reported to the system. The details of above-mentioned methods are described below.

Figure 7:
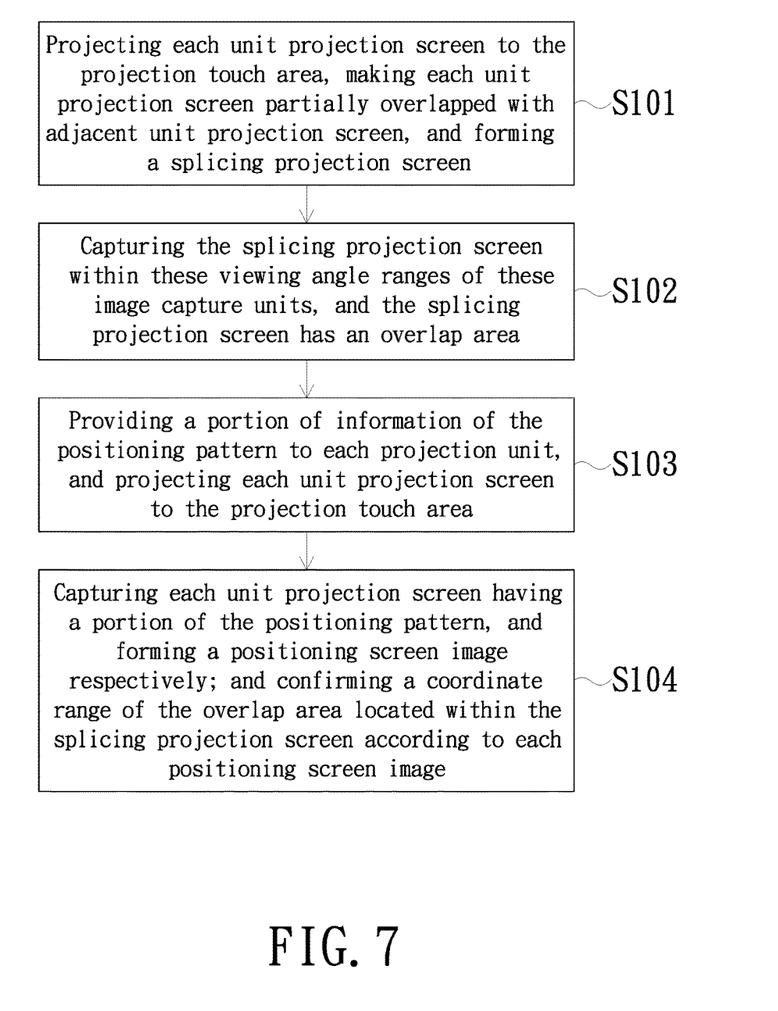
FIG. 7 illustrates a flowchart of a method of determining a touch position according to an embodiment of the invention.

Referring firstly to FIG. 7 to correspond to the above description, the implementation steps of the invention will be clearly understood, while FIG. 7 illustrates a flowchart of a method of determining a touch position of an embodiment of the invention. Step S101: projecting each projection sub-image to the projection touch area, wherein each projection sub-image is partially overlapped with the adjacent one of the other projection sub-image to form a blending projection image. Step S102: capturing the blending projection image within the multiple viewing angle ranges of several image capture units respectively, and making the blending projection image including overlap areas. Step S103: providing a portion of information of the positioning pattern to each projection unit, and projecting each projection sub-image with a portion of information of the positioning pattern to the projection touch area. Step S104: capturing each projection sub-image with a portion of information of the positioning pattern and forming a positioning image respectively; and confirming a coordinate range of the overlap area located within the blending projection image according to each of the positioning images.

Overlap Area Detection (OAD) Technology:

Please then refer to FIGS. 2A, 2B and 3A to 5B, the overlap area 5 of the projection sub-images 1 projected respectively by the projection units 3 of the first interactive projection apparatus U1 and the second interactive projection apparatus U2. The overlap area 5 is as well as the overlapping section of the viewing angles of two image capture units 4, and thus the overlapping range in the viewing angles of the image capture units 4 may be identified by the way of projecting a positioning pattern P (will be described in details within the following content). Steps are as follows: firstly, a blending projection image 50 is captured by the image capture units 4 within the respective viewing angle ranges of image capture units 4. Parts of the information of the dynamic or static positioning pattern P is provided from the computer apparatus 9 to each of the projection units 3, and then projection sub-images 1 with parts of the positioning pattern P are projected to the projection touch area C respectively (see FIG. 3), and projection sub-images 1 with parts of the positioning pattern P (e.g. positioning images 1A or 1B) are captured respectively, and, accordingly, the positioning images 1A, 1B are formed respectively. Finally, a coordinate range of the overlap area 5 located within the blending projection image 50 is confirmed according to the positioning images 1A, 1B.

As shown in FIG. 2A, there is an overlap area boundary 11A or 11B located at one side of the overlap area 5 in the projection sub-image 1, and there is a relative boundary 12A or 12B on the other side of the projection sub-image 1 opposite to the overlap area boundary 11A or 11B, and the overlap area boundaries 11A and 11B of two adjacent projection sub-images 1 define the position of the overlap area 5 and also relatively determine the coordinate range of the overlap area 5. As shown in FIGS. 3A to 4D, the positioning pattern P may be a dynamic pattern moving along the moving direction M1 or M2. The moving direction M1 or M2 is from the relative boundary 12A or 12B toward the overlap area boundary 11A or 11B. And the image capture units 4 continuously capture the positioning images 1A or 1B during the process of the movement until the positioning pattern P is disappeared within the projection sub-images 1. Accordingly, the position coordinate where the positioning pattern P is capable of been completely appeared within the projection sub-image 1 may be deemed as the position coordinate of the overlap area boundary 11A or 11B.

In the embodiment shown in FIGS. 3A to 4D, the positioning pattern P may be a set of dot-shaped geometric figures having a predetermined number. For example, it may be a group of solid or hollow dots, triangles or polygons, stars, and so forth. The position coordinates of the overlap area boundaries may be determined by continuously detecting the number of the dot-shaped geometric figures during the movement of the positioning pattern P, and finding a final position coordinate where the number of the dot-shaped geometric figures is remained at a predetermined number within the projection sub-image 1. These dot-shaped geometric figures may be arranged in a row along a direction perpendicular to the moving direction M1 or M2 of the positioning pattern P, since the screen of the projection pattern may appear in the condition of trapezoidal or skew. In which, if the same positioning pattern P is applied within adjacent projection sub-images 1, the positioning pattern should be moved sequentially within each of the projection sub-images 1 to obtain respectively the position coordinates of the overlap area boundaries corresponding to each of the projection sub-images 1. On the other hand, different positioning patterns (not shown) also may be used as being moved simultaneously in each of the projection sub-images 1, and thus the position coordinates of the overlap area boundaries 11A, 11B, which are corresponding to each of the projection sub-images 1, may be obtained respectively with a shorter time.

Figure 5A:
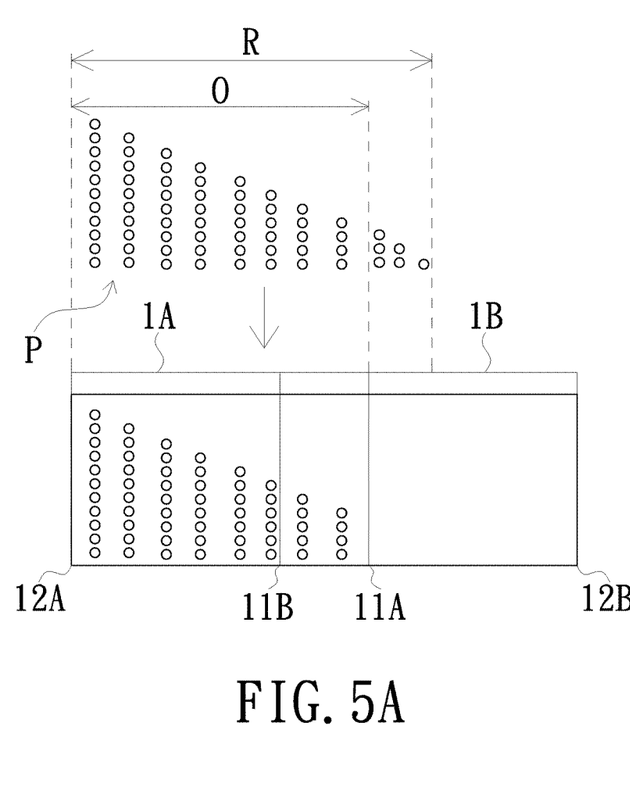
FIGS. 5A-5B are schematic views illustrating an operation of outputting a static asymmetric positioning pattern of a method of determining a touch position according to an embodiment of the invention.
Figure 5B:
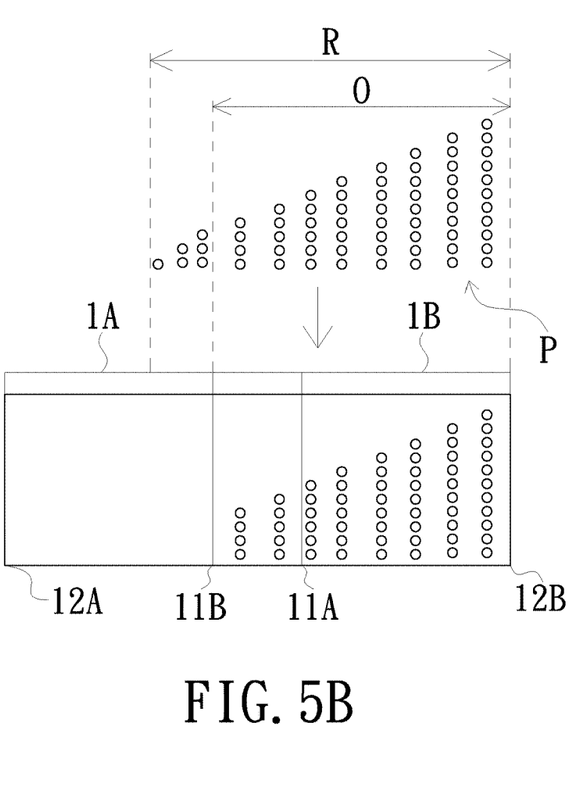

In the embodiment shown in FIG. 5 FIGS. 5A and 5B, the positioning pattern P to be utilized is a static picture with an asymmetric shape and a displayed distribution range R greater than the viewing angle range O of the single image capture unit 4 (which may be but not limited to the range covered by the projection sub-image 1), so as to determine the corresponding position coordinates of the overlap area boundaries 11A, 11B by the range of the asymmetric picture displayed between the overlap area boundaries 11A, 11B and the relative boundaries 12A, 12B in each of the positioning images 1A, 1B. For example, in the embodiment of FIGS. 5A and 5B, the positioning pattern P is a lattice picture decreasing from left to right for each row of dots, which is output in two adjacent projection units 3 in a mirror-inverted manner. Since the displayed distribution range R of the positioning pattern P is greater than the viewing angle range O of the image capture unit 4, the right/left portion of the positioning pattern P displayed respectively by the resulting positioning image 1A/1B exceeding the viewing angle range O cannot be displayed, and the dot number of the rightmost/leftmost row may determine the position coordinate of the overlap area boundary 11A/11B.

Blending Touch Analysis (BTA) Technology.

Figure 6:
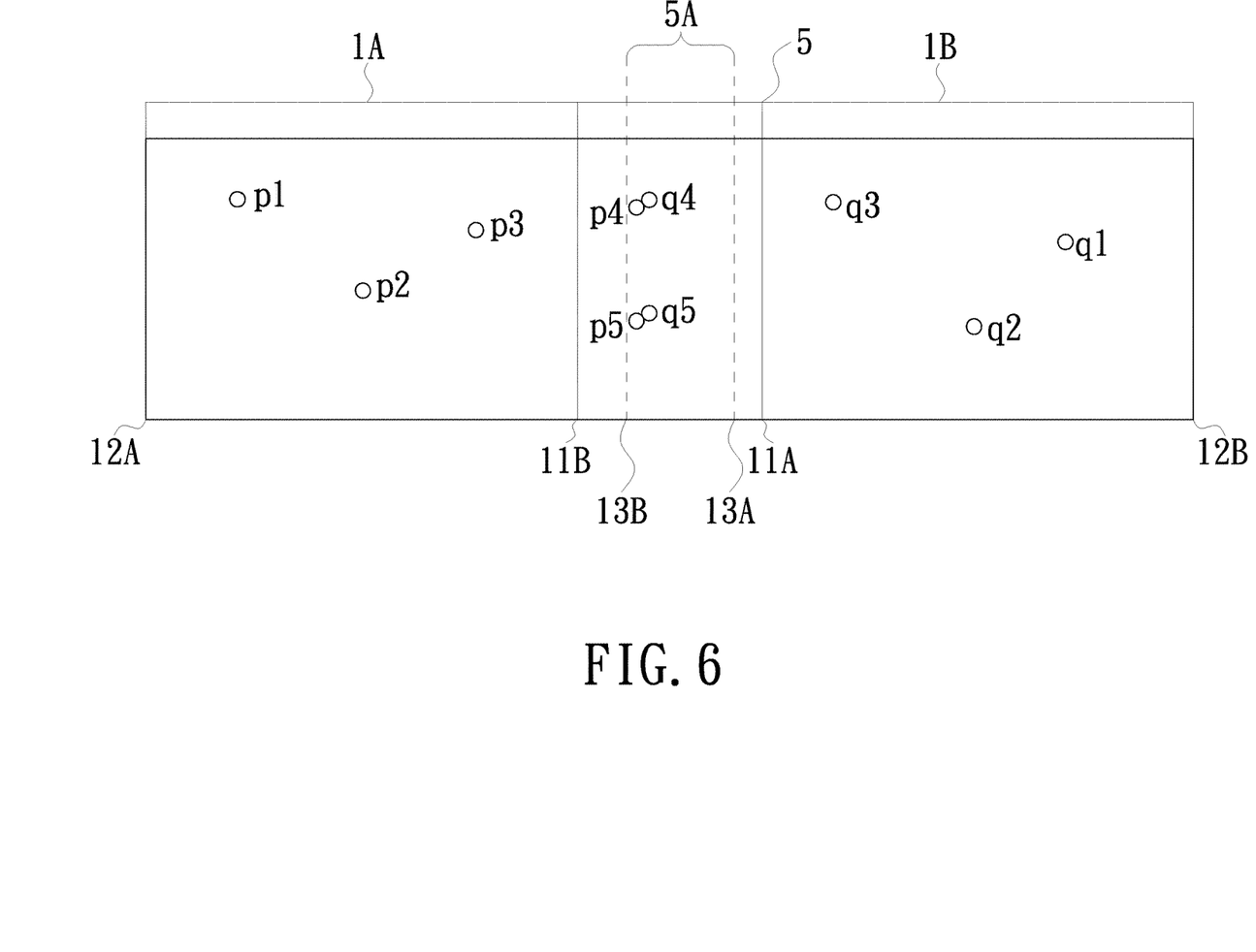
FIG. 6 is a schematic view illustrating a distribution of duplicated touch points in an overlap area of a method of determining a touch position according to an embodiment of the invention.

After obtaining position coordinates of the overlap area boundaries 11A, 11B, a touch position coordinate of a touch point may further be determined based on the coordinate range defined by the two coordinates. As shown in FIG. 6, when the touch input operation is carried out on the projection touch area C and the coordinates of touch points p1-p5 and q1-q5 may be obtained sequentially within the positioning images 1A, 1B respectively, the above-mentioned Overlap Area Detection Technology can be used to determine whether each coordinate point is located within the overlap area 5. In which, the touch points p1-p3 and q1-q3 are determined not located within the overlap area 5, so the coordinates thereof are directly determined as the touch point coordinates. The touch points p4, p5 and q4, q5 obtained within the overlap area 5 are repeated coordinate points, so one of the repeated coordinate points must be deleted. There are two criteria for dealing with repeated points when the touch points occur within the overlap area: (1) Distance: Two touch points represent the same touch point when the distance of two touch points is within a preset spacing, and only a single touch point is selected while rebuilding the touch coordinate point. (2) Time: Since left and right repeated touch points are generated sequentially, there is a problem of different pick-up times of the repeated touch points, and the touch point with earlier pick-up time is selected, and the other point is deemed as a false point and will be ignored while reconstructing the touch coordinate point.

In detail, when the input operation of the touch points p1-p5 is detected by the aforementioned first interactive projection apparatus U1 of the interactive projection apparatus 100, and the first coordinate (coordinates of the touch points p1-p5) is generated correspondingly, the first step is to determine whether this touch point is located within the overlap area 5 according to the coordinate range defined by the position coordinates of the overlap area boundaries 11A, 11B. While the touch point is not located within the overlap area 5 (e.g. the touch points p1-p3), the first coordinate is directly used as the touch position coordinate. When the touch point is located within the overlap area 5 (e.g. the touch points p4 or p5), the second coordinate (e.g. the coordinate of the touch points q4 or q5) corresponding to the same touch point detected by the second interactive projection apparatus U2 is firstly determined according to a distance criteria, and then a selected coordinate serving as the touch position coordinate is selected from the first coordinate and the second coordinate based on a time criteria, wherein the distance criteria and the time criteria will be described in detail in the following contents.

In one embodiment, when an existing interactive touch input operation keeps on going and subsequent touch points are generated (for example, in terms of the sequentially generated touch points p4, p5 and q4, q5, the touch points p5, q5 are the subsequent touch points with respect to the touch points p4, q4, respectively), the subsequent touch point coordinates, detected by the image capture unit 4 of the interactive projection apparatus 1 which detects the selected coordinate, are fixedly deemed as the touch position coordinates associated with this interactive touch input operation. For example, in case the interactive projection apparatus 1 which detects the touch point p4 is selected at the beginning for the subsequent detection, the touch point within the overlap area 5 are fixedly using the touch point (such as p5) coordinate subsequently appeared on the positioning image 1A before the same touch operation (for example, drawing a continuous line entering to or passing through the overlap area 5 on a blending projection image 50) is interrupted.

In one embodiment, the distance criteria described above is: when the distance between two coordinate points generated by two different interactive projection apparatuses (such as U1, U2) within the mutual overlap area 5 is less than a preset distance value, it is determined that the two coordinate points are corresponding to the same touch point. In general, this preset value may be about 30 pixels, but this value may be variant due to a variety of application conditions, and it should not be so limited.

In one embodiment, the time criteria described above is: when two coordinate points generated by two different interactive projection apparatuses within the mutual overlap area 5 is determined to correspond to the same touch point, compare the generated times of two coordinate points, and take an earlier or a later generated coordination as the touch position coordinate corresponding to this touch point. In general, choosing the coordinate point having earlier generated time may avoid the touch point from appearing the coordinate hop in the process of detection.

For a variety of application conditions, a smaller virtual coordinate range of the overlap area can be set within the coordinate range after the determination of the coordinate range, so as to determine whether the touch point is located within the overlap area 5 according to whether the touch point coordinate is located within the virtual coordinate range of the overlap area. As shown in FIG. 6, the virtual boundaries 13A and 13B located between the overlap area boundaries 11A, 11B can be set, and the coordinate range of the virtual overlap area 5A is defined by the position coordinates of points 13A and 13B as a basis for determining whether the touch point is located within the overlap area. For example, if there is a touch point located to the left of the overlap area boundary 11A and to the right of the virtual boundary 13A, although it is still located within the viewing angle range of the image capture unit 4 which captures the positioning image 1A, it will still be regarded as being not within the overlap area, and the coordinate on the positioning image 1B is directly deemed as a position coordinate of a touch point, and the touch point of the positioning image 1A is discharged, so that the touch pattern (such as a line) presented on the blending projection image 50 may be a continuous line, and the condition of solid and dotted will be avoided.

The number of the aforementioned interactive projection apparatus is only an example, and is not intended to limit the invention. For example, an interactive projection apparatus (not shown) can be installed on the right side of the interactive projection apparatus U2 and has an overlap area of the projection sub-image between it and the interactive projection apparatus U2, and thus makes the blending projection image 50 capable of being further extended.

The invention utilizes positioning images, generated by providing a positioning pattern to each projection unit within the touch projection system, to determine the coordinate range of the overlap area of projection sub-images, further determines the coordinate point of the repeatedly reported touch points within the overlap area based on this coordinate range, and achieves at least the following effects:

1. Enabling a normal touch operation when at least two touch apparatuses project images respectively, to form a blending image.

2. Automatically confirming the position of the overlap area in the blending image when the blending image is projected by interactive projectors.

3. Any machine which is capable of blending and merging the images of projectors may be applied with this technology to carry out the touch input operation without binding a specific type of the blending box.

4. The size of the virtual overlap area located within the overlapping range of the image may be adjusted according to a variety of requirements, since the size of the overlap area may be adjusted according to requirement, and the touch control range needed during touch calibration may thus be known.

5. A virtual overlap area is the area receiving the information simultaneously from two projectors, and is capable of proceeding recordings and handovers of information effectively, so that a continuous touch operation may pass over the junction with seamless integration and without producing any hop or delay.

The foregoing and other technology content, features and effects related to the invention will can be clearly presented from the following detailed description of a preferred embodiment taken in conjunction with the drawings. The direction terms mentioned in the following embodiment, for example: up, down, left, right, front or rear, etc., only the direction reference to the drawings. Accordingly, the direction terms used are intended to illustrate rather than limit the invention.

The foregoing is only the preferred embodiment of the invention, and cannot limit the embodied scope of the invention, simple equivalent variations and modifications made by the claims and the content of the invention are still within the scope of the invention covered. Additionally, one of embodiments or claims of the invention does not need to achieve all objects or advantages or features disclosed by the invention. In addition, summary section and title are only used to assist in searching patent, and not intended to limit the claim scope of the invention. Furthermore, the terms such as the first interactive projection apparatus, the second interactive projection apparatus, the first coordinate and the second coordinate referred in the specification or claims are only used for the naming the element name or distinguishing various embodiments or scope and do not limit the upper or lower limit on the number of the elements. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A method of determining a touch position to be used for a touch projection system including at least two interactive projection apparatuses and a computer apparatus connected to the interactive projection apparatuses, wherein each of the interactive projection apparatuses comprises a projection unit and an image capture unit with a viewing angle range, the method comprising:
   projecting projection sub-images to a projection touch area, each projection sub-image is partially overlapped with an adjacent one of the other projection sub-image to form a blending projection image;
   capturing the blending projection image within the viewing angle ranges, wherein the blending projection image has an overlap area;
   providing a portion of information of a positioning pattern to each projection unit;
   projecting each projection sub-image with the portion of information of the positioning pattern onto the projection touch area;
   capturing each projection sub-image with the portion of information of the positioning pattern so as to form a positioning image respectively; and
   confirming a coordinate range of the overlap area located within the blending projection image according to each of the positioning images.

2. The method of determining the touch position of claim 1, wherein: each of the projection sub-images has an overlap area boundary on one side of the overlap area and a relative boundary opposite to the overlap area boundary, the positioning pattern is moved in a direction from the relative boundary toward the overlap area boundary, and thus the positioning images captured by the image capture units are continuously formed during the process of the movement of the positioning pattern until the positioning pattern disappears within the projection sub-image, and a position coordinate where the positioning pattern is last taken in a complete form within the projection sub-image is determined as a position coordinate of the overlap area boundary.

3. The method of determining the touch position of claim 2, wherein the positioning pattern is a plurality of dot-shaped geometric figures having a predetermined number, the number of the dot-shaped geometric figures is continuously detected during the movement of the positioning pattern, and a final position coordinate is taken where the number of the dot-shaped geometric figures is last maintained at the predetermined number within the projection sub-image as the position coordinate of the overlap area boundary.

4. The method of determining the touch position of claim 3, wherein the plurality of dot-shaped geometric figures is arranged in at least a row along a direction perpendicular to the moving direction of the positioning pattern.

5. The method of determining the touch position of claim 2, wherein the same positioning pattern is moved sequentially within each of the projection sub-images, and the projection sub-images are adjacent one by one, and the position coordinates of the overlap area boundary corresponded by each of the projection sub-images are obtained respectively.

6. The method of determining the touch position of claim 2, wherein different positioning patterns are respectively applied to the projection sub-images adjacent one by one, so that the different positioning patterns may be moved respectively and simultaneously within each of the projection sub-images, and the position coordinates of the overlap area boundaries corresponding to each of the projection sub-images are respectively obtained.

7. The method of determining the touch position of claim 1, wherein each of the projection sub-images of the at least two interactive projection apparatuses has an overlap area boundary located on one side of the overlap area and a relative boundary opposite to the overlap area boundary, and the positioning pattern is an asymmetric picture with a displayed distribution range greater than the viewing angle range, so as to determine the corresponding position coordinate of the overlap area boundary by the range of the asymmetric picture displayed between the overlap area boundary and the relative boundary in the positioning image.

8. The method of determining the touch position of claim 1, further comprising a step of determining a touch position coordinate of a touch point according to the coordinate range, which is completed by the following steps:

while an input of the touch point is detected in a first interactive projection apparatus of the interactive projection apparatuses, determining firstly whether the touch point locates within the overlap area or not according to the coordinate range;

while the touch point is not located within the overlap area, taking a first coordinate as the touch position coordinate directly;

while the touch point is located within the overlap area, finding out a second coordinate corresponding to the touch point detected by a second interactive projection apparatus of the interactive projection apparatuses according to a distance criteria, then choosing a selected coordinate as the touch position coordinate between the first coordinate and the second coordinate according to a time criteria; and when an interactive touch input operation is proceeding and a subsequent touch point is generated, fixedly taking a subsequent touch point coordinate detected by the interactive projection apparatuses detecting the selected coordinate, as the touch position coordinate associated with the interactive touch input operation.

9. The method of determining the touch position of claim 8, wherein the distance criteria is:

while a distance between two coordinate points generated by two different interactive projection apparatuses within the overlap area is less than a preset distance value, determining that the two coordinate points are corresponding to the same touch point.

10. The method of determining the touch position of claim 8, wherein the time criteria is:

while two coordinate points generated by two different interactive projection apparatuses within the overlap area are determined as being corresponding to the same touch point, comparing the generated times of the two coordinate points, and taking an earlier one or a later one as the touch position coordinate corresponding to the touch point.

11. The method of determining the touch position of claim 8, further comprising steps of:

setting a virtual coordinate range of the overlap area within the coordinate range, and determining whether the touch point is located within the overlap area according to determining whether the first coordinate is located within the virtual coordinate range of the overlap area.

* * * * *